Jan. 28, 1969 J. R. SOLUM ET AL 3,424,245

WELL TOOL

Filed July 19, 1966 Sheet 1 of 5

JAMES R. SOLUM
ROBERT O. PARK
INVENTORS.

BY Lyon & Lyon
ATTORNEYS

JAMES R. SOLUM
ROBERT O. PARK
INVENTORS.

BY Lyon & Lyon
ATTORNEYS

United States Patent Office 3,424,245
Patented Jan. 28, 1969

3,424,245
WELL TOOL
James R. Solum, Los Angeles, and Robert O. Park, Lakewood, Calif., assignors to B & W Incorporated, Torrance, Calif., a corporation of California
Filed July 19, 1966, Ser. No. 566,400
U.S. Cl. 166—124    23 Claims
Int. Cl. E21b 33/12, 23/06, 43/10

This invention relates to a well tool for use in performing various functions, primarily in oil wells, and the companion tool for operating and releasing such well tool. In particular, this invention is concerned with a tool arrangement for hanging a perforated or slotted liner within a well casing, sealing the top of the liner with the well casing, and permitting the filling of the annular space between the liner and the well casing with sand-excluding gravel for the length of the liner. Moreover this invention specifically contemplates such a tool arrangement for accomplishing these functions during a single trip or run into the well and without the need for left-hand rotation for its operation.

In the completion of oil wells it is relatively common to hang a liner within the well casing which is cemented in the well bore and to then seal the top of the liner with the inside of the well casing to insure that all of the production fluid flows up through the liner. The liner is provided with machined slots or holes of a predetermined size to freely admit the well production fluid but exclude particulate matter. It is also a well known practice to fill the annular space outside the liner with gravel of a predetermined size which serves to filter the fluid and exclude unconsolidated sands which might otherwise pass through the slots and fill the liner. Such gravel is of a predetermined size which more closely represents coarse sand but is of a sufficiently large particle size as not to pass through the liner slots. While numerous conventional commercial devices are available for performing, with various degrees of efficiency, each of the functions of hanging and packing-off the upper end of the liner and introducing the gravel into the annulus, such available tools normally require more than one round trip of the well tubing to accomplish all the functions. Moreover it has been found that the adverse conditions present in the bottom of the well often cause the heretofore conventional tools to malfunction thereby preventing the proper accomplishment of the desired functions. For example, a liner hanger usually includes toothed slips which are moved outwardly to engage and grip the well casing but such slip movement is often prevented by the intrusion of sand and other materials between the moving parts. A further example is in the inability to close a port collar which has been opened to introduce the gravel into the annulus thereby leaving a by-pass for contaminated fluid into the liner. A still further example of well known difficulties is the inability to manipulate the tubing string with sufficient precision to operate the down-hole tool to accomplish the desired functions which might require engagement and disengagement from a J slot or perilous left-hand rotation.

It is therefore a principal object of this invention to provide a novel form of well tool operable to hang a liner within a well casing, pack off the top of such liner with the well casing and selectively open and close a port collar below the packer to introduce gravel into the annular space surrounding the liner, all through an appropriate sequence of longitudinal and right-hand rotational movement of the tubing string.

Other objects of this invention are to provide a novel form of liner hanger in which the casing engaging slips are fully supported on the hanger body in surface contact on the back side and such slips are mechanically urged through the initial outward movement by rotation of the tubing string to assure freedom of movement of such slips.

A further object of this invention is to provide a unique port collar arrangement which is moved between open and closed positions by mere rotation of the tubing string and is noticeably but releasably constrained in either a full open or completely closed position at different degrees of rotation.

Still another object of this invention is to provide a novel well tool combining a packer and port collar which are operated by a setting tool wherein downward force on the setting tool to accomplish setting of the packer affirmatively locates and supports the setting tool in the proper elevation for aligning the port collar opening with the fluid discharge arrangement in the setting tool without further effort. A further object is to provide such an arrangement wherein the port collar is operated by rotational movement and the setting tool is supported on the packer device in a manner for substantially non-frictional rotation.

A still further object of this invention is to provide a novel back-up ring arrangement for the expandable packer element of a packer which expands with the packing element to prevent longitudinal extrusion of the material of the packing element within the annular space.

Other and more detailed objects and advantages of the well tools of this invention will appear from the following description and the accompanying drawings, wherein:

FIGURES 2a and 2b are a broken view of the upper and lower portions, respectively, of the complete well tool with the right side shown in section and the left side shown in elevation and with the component parts in their respective positions during running the tool into the well.

FIGURE 8 is a sectional plan view taken substantially on the line 8—8 shown in FIGURE 2a.

FIGURE 9 is a sectional plan view taken substantially on the line 9—9 shown in FIGURE 2b.

FIGURES 10 and 11 are elevation views of the port collar position retaining means in the preselected and intermediate positions, respectively, of the port collar.

FIGURE 15 is a sectional plan view taken substantially on the line 15—15 shown in FIGURE 2a.

FIGURE 16 is a fragmentary exploded view of the portion of the packer device illustrated in section by FIGURE 15.

FIGURE 18 is an enlarged fragmentary sectional elevation of the arrangement for retaining and mechanically causing the initial movement of the hanger slips.

FIGURE 19 is a view similar to FIGURE 18 showing the initial movement of the hanger slips.

FIGURE 20 is an enlarged fragmentary sectional elevation of the packer setting lug means in their retracted position before complete release of the tool.

FIGURE 21 is a view similar to FIGURE 20 but illustrating the lugs in their expanded position for use in setting the packer as shown in FIGURE 5a.

FIGURE 22 is an enlarged fragmentary elevation of the back-up ring arrangement for the packer element in the unexpanded condition and FIGURE 23 is similar to FIGURE 22 but illustrates the packing element in its expanded condition.

Figure 1:
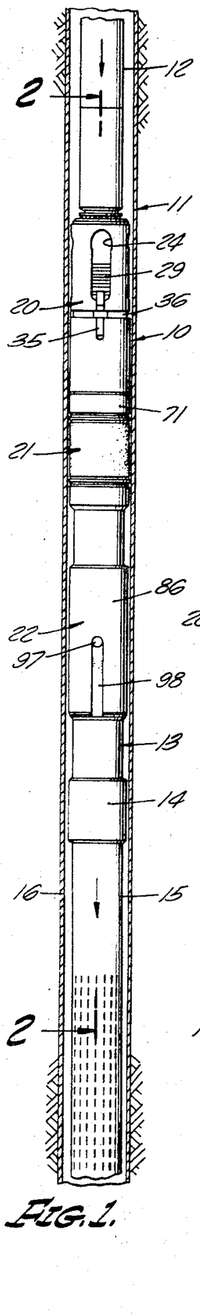
FIGURE 1 is an elevation view of the well tool arrangement of this invention in the assembled condition and running a liner into the casing of a well.

Referring first to FIGURE 1 the well tool, generally designated 10, of this invention includes an operating or setting tool, generally designated 11, positioned therein with only the upper end visible which is attached to a conventional string of well tubing 12 for lowering the tools into the well. The lower end 13 of tool 10 is connected through a conventional coupling 14 to the upper end of a string of liner pipe 15 which is conveniently shown here as slotted liner. The assemblage of liner pipe 15, well tool 10, setting tool 11 and tubing 12 is run into the well casing 16 in the conventional manner without regard for extraneous up-down movement or right-hand rotation since such movement or rotation will not prematurely actuate or adversely affect any of the components of the well tool 10 or setting tool 11. While the well tool 10 is an integrated tool, it may for convenience be considered to include a liner hanger device portion 20, a packer device portion 21 and a port collar device portion 22 which perform their respective functions and cooperate to perform the desired overall function. These portions of the well tool 10 are operated and function generally in the order of sequence in which they are numbered, that is, in the normal operation the hanger is set first, the packer is expanded and then the port collar is appropriately manipulated.

Figure 2A:
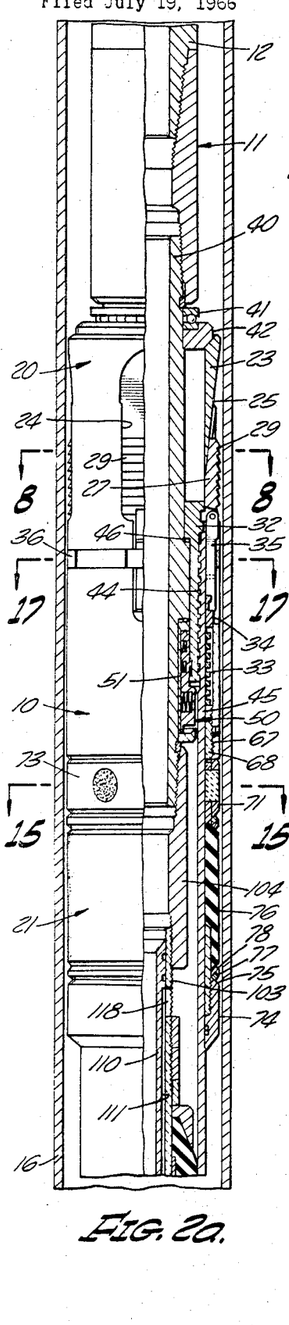

Referring now more particularly to FIGURE 2a the uppermost or hanger portion 20 of the tool 10 includes a generally cylindrical housing 23 having plural slip ways or sockets 24 of which four are shown in this embodiment although more or fewer may be employed. Each socket 24 includes an upwardly and outwardly inclined surface 25 extending longitudinally of the housing with dovetail slots 26 on either lateral extremity of the surface. A slip 27 is mounted in each socket 24 and has a flat under surface for mating with the surface 25 to provide a maximum support area on the housing 23 for the slips.

Each slip 27 has a rib 28 along each longitudinal edge for slidably fitting within the dovetail slots 26 to support and guide the slip within the socket 24. The slips are provided with a toothed exterior surface 29 of a shape and curvature for engaging and gripping the interior of the casing 16. As the slips 27 move upwardly relative to the housing 23 they move outwardly to engage the casing and the taper of surfaces 25 is such as to cause locking of the slips to prevent downward movement of the housing 23.

Figures 16, 18, 19, 20, 21, 22, 23:
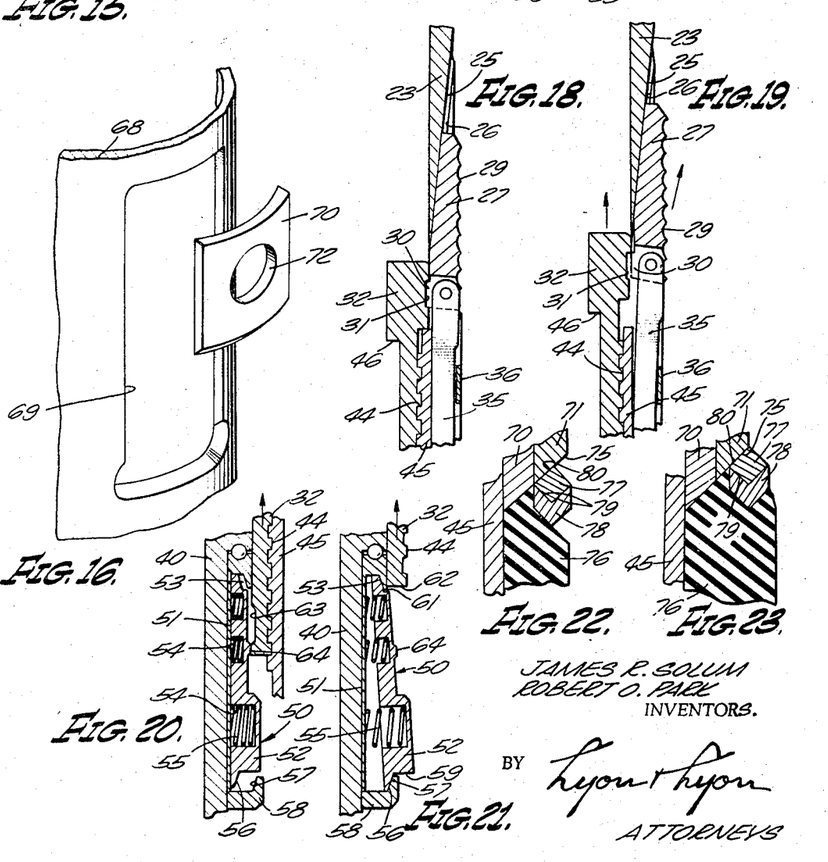
Figure 17:
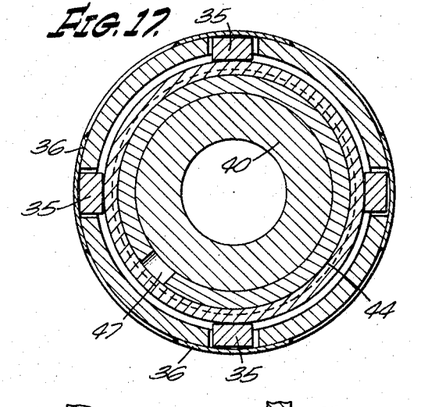
FIGURE 17 is a sectional plan view taken substantially on the line 17—17 shown in FIGURE 2a at the location of the hanger slip actuators.

While running the tool 10 and liner 15 into the well bore the slips 27 are retained in a retracted position away from engagement with the well casing 16 as shown in FIGURES 2a and 18. This is accomplished by the interengagement of an inwardly projecting ridge 30 on the lower extremity of each slip 27 with an annular groove 31 in the exterior surface of the tool releasing bushing 32, as best shown in FIGURE 18. When release bushing 32 is moved upwardly, as hereinafter described, the interengagement of ridge 30 in groove 31 causes each of the slips 27 to be mechanically forced upwardly as shown in FIGURE 19 thereby freeing the slips 27 from any stuck condition which might occur due to the intrusion of sand or the like. Thus it is insured that each of the slips 27 are started toward their outward casing engagement movement. Their continued upward-outward movement of slips 29 is caused by a stiff helical spring 33 encircling the tool and bearing against the lower end of a ring 34. A connecting arm 35 is pinned to each slip 27 and extends downwardly into latching engagement with the ring 34 whereby the helical spring 33 urges all four slips 27 upwardly in a uniform manner. The connecting arms 35 are retained in engagement with ring 34 by means of arcuate straps 36 fixed in a groove over the exterior of the arms, see FIGURE 17.

In setting the hanger portion 20 of the to ol10the SR

In setting the hanger portion 20 of the tool 10 the liner 15 is rested on the bottom of the well bore to support the tool and weight is placed downwardly thereon through the tubing 12 and setting tool 11. The setting tool 11 includes a central tubular mandrel 40 on which is mounted a thrust bearing 41 and a flange plate 42 for engaging the upper end of housing 23 in the assembled condition of the tool 10 and setting tool 11. The downward force on setting tool 11 is transferred from the upper end of mandrel 40 through thrust bearing 41 to flange 42 and then housing 23 whereby the mandrel 40 may be freely rotated in this weight-down condition. Within the upper portion of housing 23 the mandrel 40 is provided with a non-cylindrical exterior surface 43, such as the relatively square shape shown in FIGURE 8, which mates with a similar interior surface on the upper end of the release bushing 32 thereby forming a spline connection between the mandrel 40 and release bushing 32 to permit relative longitudinal movement during simultaneous rotational movement. The release bushing 32 is provided with a left-hand external thread 44 which is preferably a square or acme thread for threaded connection to the upper end of a sleeve 45 which, as will appear more fully hereinafter, is ultimately connected to the liner 15 through various fixed components. Thus in effect during running-in the liner 15 is supported by the mandrel 40 through upwardly facing shoulder 46 engaging the underside of a mating shoulder on release bushing 32.

Figure 3A:
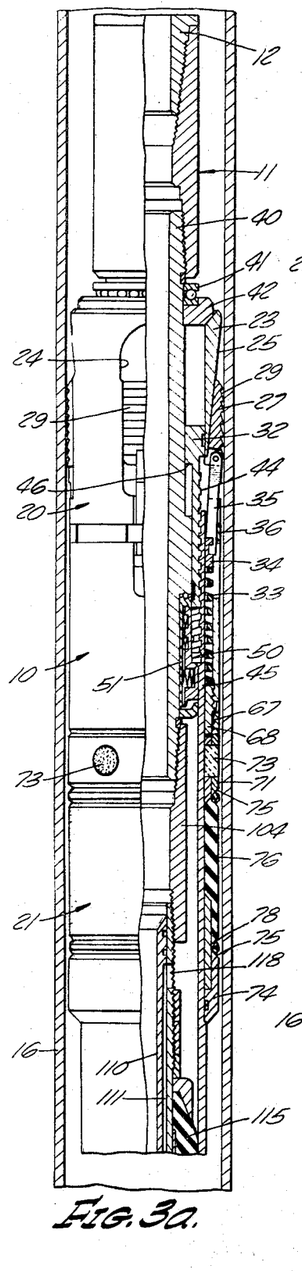
FIGURES 3a and 3b are views similar to FIGURES 2a and 2b but with the component parts illustrated in their respective positions after resting the liner on the bottom and making approximately four right hand revolutions of the tubing string to release the hanger slips without releasing the entire tool.
Figure 3B:
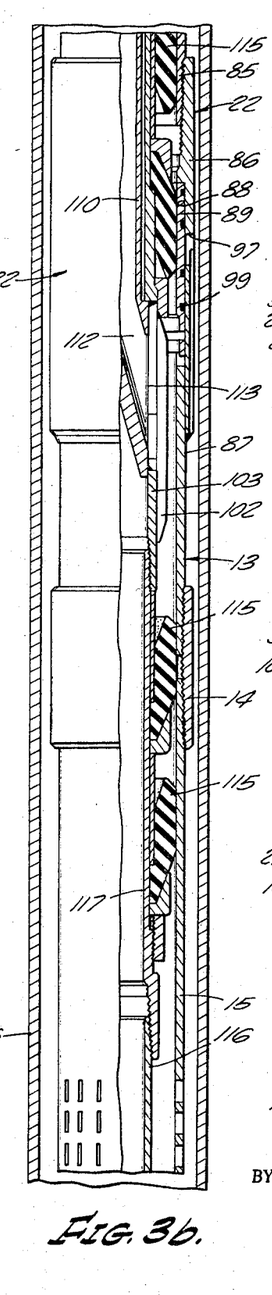
Figure 4:
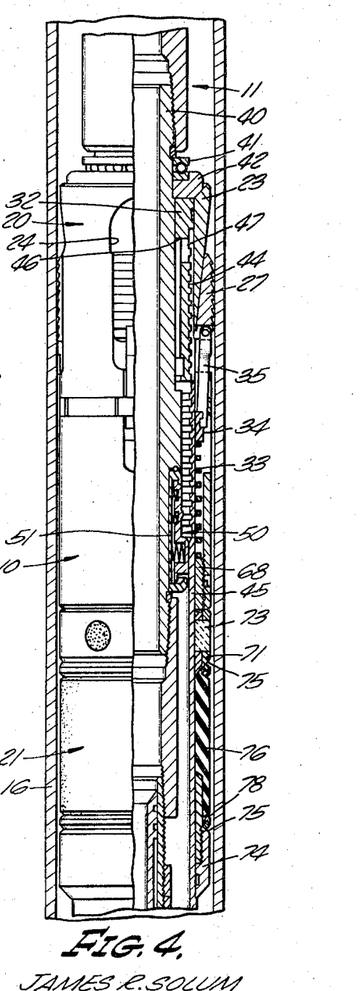
FIGURE 4 is a half section view of the upper portion of the tool similar to FIG. 3a but illustrating the tool lifted to the desired elevation within the well casing with the hanger slips set and after further right-hand rotation of the tubing string to release the entire tool.

Returning to the sequence for releasing slips 27, the setting tool 11 is rotated in a right-hand direction for approximately four turns thereby causing the release bushing 32 to move upwardly as it unthreads due to the left-hand threads 44. This amount of rotation is sufficient to cause the slip movement illustrated from FIGURE 18 to FIGURE 19 and to release the slips for upward urging by spring 33. The tubing 12 and setting tool 11 may then be lifted thereby again lifting the liner by means of sleeve 45, release bushing 32, shoulder 46 and mandrel 40 since the threads 44 have not been completely unthreaded. The slips 27 merely slide along the interior of casing 16 during this upward movement. However upon setting weight down on the tool by lowering tubing 12 the slips 27 will be set into casing engagement thereby supporting housing 23 as shown in FIGURE 3a. Again the tubing 12 and setting tool 11 is rotatably supported by the thrust bearing 41 and further right-hand rotation will cause the release bushing 32 to unthread from the upper end of sleeve 45, as shown in FIGURE 4. It is to be noted from FIGURE 4 and FIGURE 17 that one or more holes 47 may be provided through the wall of release bushing 32 in order to prevent a fluid or hydraulic "lock" from occurring which would inhibit the free movement of release bushing 32 on mandrel 40. In this condition the liner 15 is supported by the hanger portion 20 of the tool 10 and the setting tool may be lifted without lifting tool 10 or liner 15.

Figure 5A:
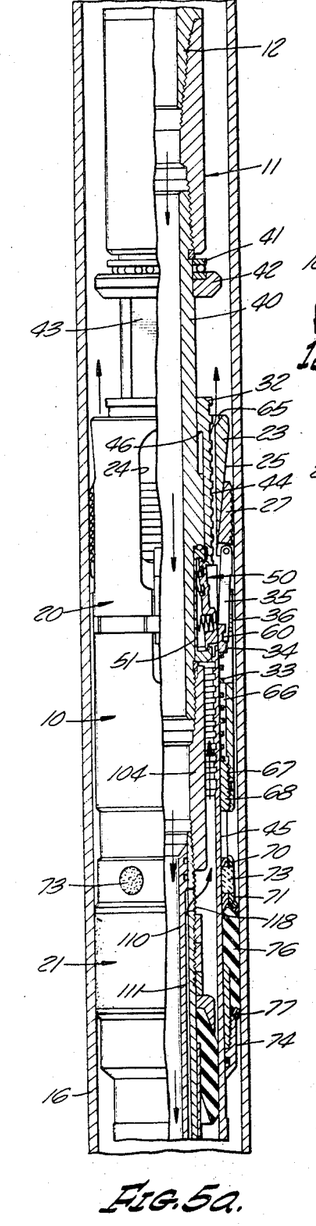
FIGURES 5a and 5b are views similar to FIGURES 2a and 2b and FIGURES 3a and 3b but with the components in their positions following setting the hanger slips and after the setting tool has been sequentially lifted a short distance and lowered to this position for expandably setting the packer element. Also, the port collar is opened to establish the cross-over circulation for gravel packing the exterior of the liner.

From the condition shown in FIGURE 4 the setting tool 11 is lifted approximately one foot, or even entirely above the tool 10, and then lowered again. Means are provided on the setting tool 11 for engaging the upper end of sleeve 45 to expand and set the packer device portion 21 of the tool 10 and properly locate the setting tool 11 relatively to the port collar portion 22 of the tool upon such lowering and, as shown more particularly in FIGURES 20 and 21, these means may include an expanding lug assembly generally designated 50. Lug assembly 50 includes a cylindrical housing 51 rotatably mounted on the mandrel 40 with a thrust bearing 52 between the upper end of housing 51 and a downward facing shoulder on mandrel 40. A plurality of arcuate shaped lugs 52 are positioned around the surface of the housing 51 with their upper ends captured beneath a downward extending flange 53 on housing 51. Each lug 52 is provided with plural bores 54 facing inwardly and having coil compression springs 55 positioned in such bores to continually urge the lugs 52 outwardly. The lower end of each lug is provided with a lip 56 adapted to engage an outwardly spaced and upwardly facing flange 57 provided on a collar 58 at the bottom of the assembly. By this arrangement the lugs 52 may pivot outwardly at their lower ends to present a downwardly facing abutment 59 which is at the appropriate diameter for engaging the upper end 60 of sleeve 45 of tool 10. In the running-in condition of the tools the release bushing 32 overlies the lug assembly 50 holding the lugs 52 in the retracted condition shown in FIGURE 20. After the aforedescribed unthreading of release bushing 32 the lugs 52 are free to pivot outwardly. As shown more clearly in FIGURE 21 the upper end of each lug 52 moves outwardly a sufficient distance to present an upwardly facing shoulder 61 adapted to engage the lower end 62 of the release bushing 32 to prevent the release bushing from dropping over the lugs 52 when the setting tool is lifted upwardly. A groove 63 is provided on the inside lower end of release bushing 32 to receive a ridge 64 on the exterior of the lugs 52 in the normal assembled condition of the tools and upon the upward release movement of bushing 32 the ridge 64 is engaged by the lower end of the release bushing 32 to depress the lugs 52, as shown in FIGURE 20, thereby tending to free the lugs from any stuck condition which may have occurred during running the tool into the well. After lifting the setting tool to expand lugs 52 the tool is lowered to the position of engaging the upper end 60 of sleeve 45 as shown in FIGURE 5a. It is to be noted that the upper end of the liner housing 23 is provided with an inwardly tapered shoulder 65 which will tend to guide the setting tool and lugs back into tool 10 if the setting tool has been lifted a substantial distance. With abutment 59 of lugs 52 engaging the upper end 60 of sleeve 45 the setting tool is rotatably supported on sleeve 45 through bearing 52 for substantially free rotation of the tubing 12.

Figure 15:
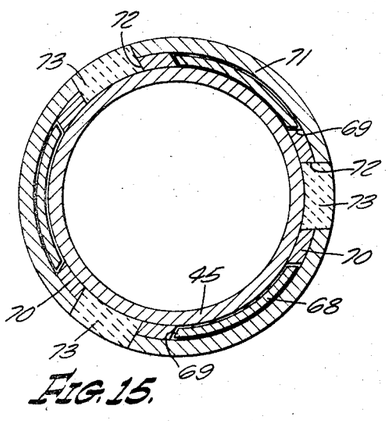

Setting of the packer device portion 21 of the tool 10 is accomplished by the downward force applied through lug assembly 50 on the upper end of sleeve 45 although it will be noticed that the weight of the liner 15 is supported by sleeve 45 and, if sufficiently heavy, may actually cause and accomplish the setting of the packer device portion 21 without the need for application of such downward force. The upper end of sleeve 45 is positioned within the lower end of housing 23 and the annular space 66 therebetween is occupied by the helical slip-actuating spring 33. The lower end of housing 32 is threadedly connected at 67 to a cage sleeve 68 slidably mounted on the exterior of sleeve 45. As shown in FIGURES 15 and 16, the cage sleeve 68 is provided with plural, here three, longitudinally extending cutouts 69. Arcuate pads 70 of the thickness of cage 68 are positioned in the cutouts 69 and are encircled by a ring 71. Holes 72 through the pads 70 and ring 71 permit plug welding 73 of the ring 71 and pads 70 to the sleeve 45 but this arrangement still permits relative longitudinal movement between the cage 68 and sleeve 45. The lower end of cage 68 is connected to a collar 74 slidably and sealably mounted on the exterior of sleeve 45. The upper extremity of collar 74 and the lower extremity of ring 71 have similar inclined surfaces 75 which are inclined outwardly away from each other, that is, the surface 75 on collar 74 is inclined outwardly-downwardly and the surface 75 on ring 71 is inclined outwardly-upwardly. The angle of inclination is approximately 45 degrees as best shown in FIGURES 22 and 23. The expandable packer element 76 is positioned between ring 71 and collar 74 and may be of any convenient material such as rubber, as shown, or lead. The packer element 76 is annular and is adapted to expand radially upon longitudinal compression of the element as is well known in the art.

At each end of the packer element 76 there is provided a pair of mating back-up rings 77 and 78 which are comprised of a stiff and resilient material such as steel but are split at one point in their circumference to permit circumferential-radial expansion of the rings. The split portion of ring 77 is circumferentially offset from the split portion of ring 78. The rings 77 and 78 have mating surfaces 79, here shown as a V-shape although other shapes may be used, which cause the two rings to expand and contract simultaneously so long as they are prevented from longitudinal separation. Ring 78 is embedded in the material of packer element 76 and ring 77 is provided with an inclined surface 80 for mating with the inclined surface 75 on the ring 71 or collar 74. With this arrangement as the packer element 76 is expanded through longitudinal compression to engage the inner wall of casing 16, the combined axial and radial forces urge the back-up rings 77 and 78 outwardly along the inclined surface 75 along with the expanding packer element 76 as shown in FIGURE 23. In this manner the material of the packer element 76 is prevented from stripping or "extruding" upwardly or downwardly through the annular spaces between the casing wall and the packer device as is a relatively common occurrence in heretofore conventional packers. The rings 77 and 78 are preferably of a radial thickness greater than the annular space between the casing wall and either ring 71 or collar 74 so that the rings themselves cannot be "extruded" over the exterior of the device. This preferable size of ring may not be possible in certain situations due to the casing size or tolerances but in any event the rings will expand to a sufficient degree to assist in preventing the packer element material from longitudinally extruding.

The longitudinal compression of packer element 76 is accomplished by reason of the lower end being restrained by collar 74 connected through cage 68 to the hanger housing 23 supported in the casing and the upper end of the packer element 76 being urged downwardly by ring 71 joined to the sleeve 45 which both supports the weight of the linear 15 and is forced downwardly by the lug assembly 50 of the setting tool 11. This accomplishes a permanent seal between the tool 10 and the interior of casing 16 at this location.

Figures 2B, 8, 9, 10, 11:
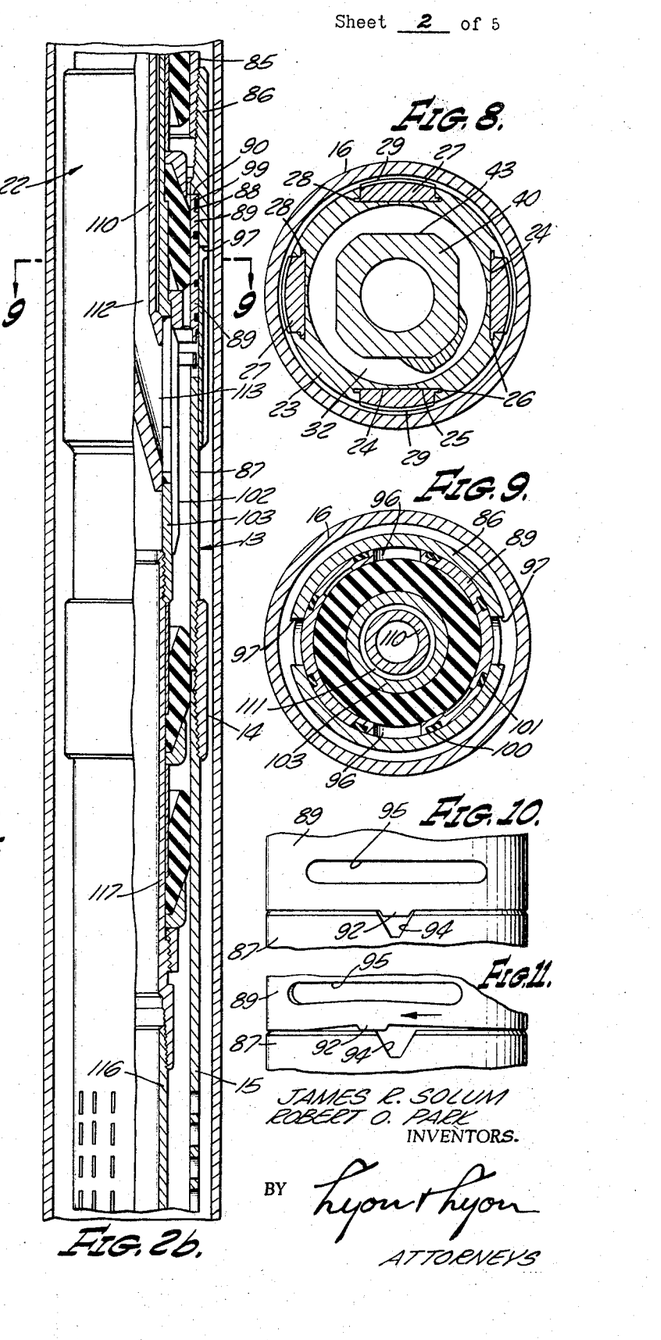

Means are provided in well tool 10 for introducing fluid, gravel or other materials in the annular space between liner 15 and casing 16 below the packer 21 and, as shown in the drawings, these means may include the port collar portion 22 of the device which is shown in greater detail in FIGURES 2a, 3b, 5c, 7 and 9 through 14. The port collar portion 22 includes the lower end 85 of the sleeve 45 which is threadedly connected to a tubular collar 86 which is in turn welded to a tubular sleeve 87 extending downwardly from the lower end of collar 86 and forms the aforementioned lower end 13 of the tool 10. Collar 86 is provided with a cylindrical bore 88 in which a tubular sleeve 89 is mounted. The upper end 90 of sleeve 89 abuts a downwardly facing shoulder in collar 86 to prevent relative upward movement of the sleeve. The lower end 91 of sleeve 89 is circular for the majority of its periphery but is provided with two axially projecting plugs 92 oriented 180° from each other. The upper end 93 of sleeve 87 is circular for a substantial proportion of its periphery with the exception of the provision of four notches 94 oriented 90° from each other. The spacing between the downwardly facing shoulder in collar 86 and the upper end 93 of sleeve 87 is equal to the length of sleeve 89 between its ends 90 and 91 whereby the sleeve 89 is axially located and confined. The sleeve 89 is provided with a circumferential slot 95 spaced a short distance above each lug 92 to permit resilient axial deflection of the lug 92 as shown in FIGURE 11. The lugs 92 are provided with tapered edges at their circumferential extremities to match the tapered sides of the notches 94 whereby rotational force applied to sleeve 89 will cause axial deflection of each lug 92 to ride out of the notch 94 but it is to be noted that very high rotational forces are required to accomplish this. Also it will be noted from the fact that four notches 94 are provided that the sleeve 89 may be indexed or located at four positions 90° spaced from each other.

The sleeve 89 is provided with two diametrically spaced ports 96 adapted to match two similarly diametrically spaced ports 97 in the collar 86 in two of the four located positions of collar 89. Downwardly extending grooves 98 are provided in the exterior of the collar 86 from the ports 97 to provide the maximum possible flow area for material, such as gravel, flowing outwardly through port 97 and downward. The sleeve 89 is provided with encircling seals 99 above and below the locations of the ports for engagement with the bore 88 of the collar 86. Each port 96 is encircled by a seal 100. Two circular seals 101 similar to seals 100 are provided on the exterior of sleeve 89 located 90° from the ports 96 whereby such seals 101 encircle ports 97 in the indexed positions of sleeve 89 shown in FIGURES 2b and 9. Upon another 90° rotation of sleeve 89 ports 96 will be aligned with ports 97 and will be surrounded by seals 100. Thus the ports 97 are alternately opened and closed.

Figures 5B, 12, 13, 14:
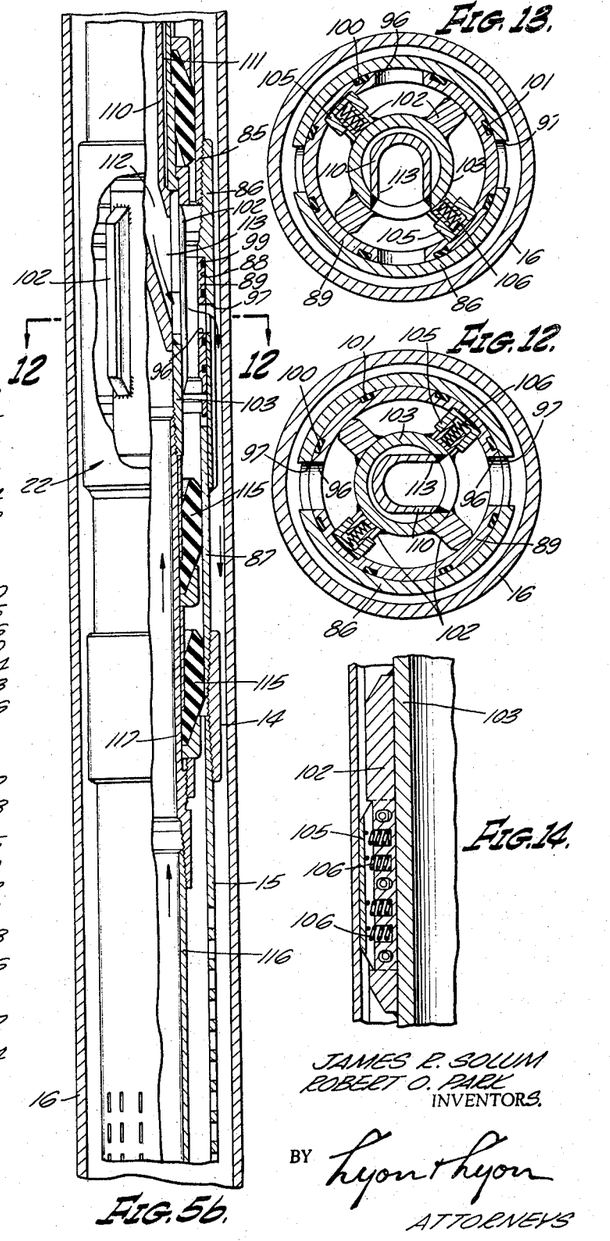
FIGURE 12 is a sectional plan view taken substantially on the line 12—12 shown in FIGURE 5b at the location of the opening in the port collar with the port collar in the open position.
FIGURE 13 is a sectional plan view similar to FIGURE 12 but illustrating the port collar in a closed position due to rotation of the setting tool.
FIGURE 14 is a fragmentary sectional elevation of the engaging means for causing rotation of the port collar between open and closed positions.

The rotation of sleeve 89 within collar 86 of the port collar portion 22 of this tool is accomplished by the lower portion of setting tool 11. A plurality of ribs 102, here four, are provided on a tubular mandrel 103 and slidably fit the interior of sleeve 89 to center the mandrel therein. Mandrel 103 is effectively an extension of mandrel 40 by means of a collar 104 connecting the two mandrels. Two of the ribs 102 are provided with the expanding key lugs 105 which are comprised of a channel shaped member loosely pinned to the rib and urged outwardly by springs 106 captured thereunder. The collar 89 is provided with two diametrically spaced internal keyways 106 adapted to fit the key lugs 105. The longitudinal spacing between the aforedescribed packer setting lug assembly 50 and the key lugs 105 is such that the latter will be longitudinally aligned with the sleeve 89 as shown in FIGURES 5a and 5b. Thus after the packer element 76 has been expanded the setting tool 11 is rotated in the right-hand direction (although for purposes of this operation it could be rotated in the undersirable left-hand direction) until the lugs 105 will engage the keyways 106 and the application of rotational forces will cause successive 90° movements of sleeve 89 relative to collar 86. In this manner the ports 96 and 97 will be alternately aligned and misaligned every 90° of rotation to open and close, respectively, the port collar device.

The fluid pumped downwardly through the tubing string 12 is introduced outwardly through aligned ports 96 and 97 through a cross-over tool arrangement comprising a tube 110 mounted within the mandrel 103 and leaving an annular space 111 therebetween. Tube 110 extends downwardly from the upper end of mandrel 103 to a location between a pair of the ribs 102 where such tube is turned laterally at 112 to form a lateral opening 113 in the mandrel 103. This lower end of the tube is welded to mandrel 103 to complete the seal. In this manner fluid passing down through tubing 12 will pass downwardly through tube 110 and outwardly through opening 113 and then outwardly through ports 96 and 97 if such ports are aligned. Above and below the location of opening 113 there are provided packer cups 115 in the conventional manner to confine the flow from tube 110 outwardly through the port collar. The return fluid passes upwardly through the interior of a wash pipe 116 connected to the packer cup supporting sleeve 117 which is in turn connected to the lower end of mandrel 103 and through the annular space 111 surrounding tube 110. A lateral port 118 in mandrel 103 above the uppermost packer cup 115 allows the upwardly flowing fluid to pass into the space between the tool 10 and setting tool 11 and then upwardly in the annular space thereabove. These flow directions are shown in FIGURES 5a and 5b by the unnumbered arrows. In this manner the gravel and fluid may be introduced at the top of tubing 12 and passed downwardly through the setting tool and out through the ports to fill the annular space between the liner 15 and casing 16. The fluid passes in through the slots in the liner to the lower end of the wash pipe 116 and returns to the surface of the well in the aforedescribed manner. Whether the port collar portion 22 is open, i.e. the ports 96 and 97 are aligned, or closed is determined merely by attempting to pump downwardly through tubing 12 as the sleeve 89 is rotated in 90° increments with the result that increased pressure shows the port collar is closed and decreased pressure shows that it is open.

Figure 6:
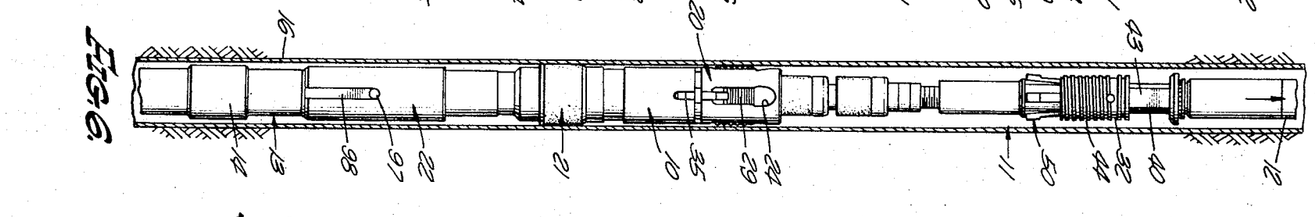
FIGURE 6 is an elevation view of the well tool hung and sealed in place following the gravel packing and with the setting tool being lifted out of the well bore.
Figure 7:
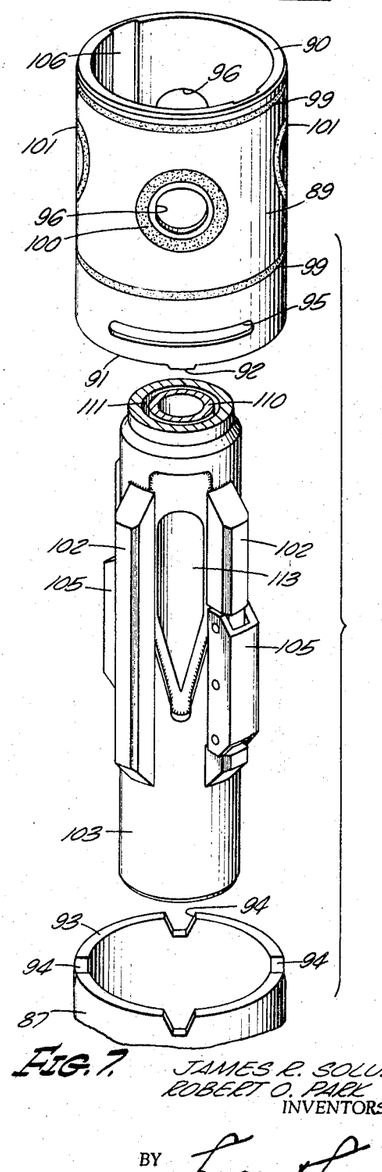
FIGURE 7 is an exploded view of the movable port collar element and that portion of the setting tool for actuating same.

Following the conclusion of the gravel packing operation or any other operation which may be desired to be performed through the port collar portion 22 of the tool, the tubing 12 is rotated 90° to rotate a sleeve 89 thereby misaligning the ports 96 and 97 to close the port collar. The setting tool 11 may then be lifted from the well as shown in FIGURE 6 leaving the tool 10 in the desired position. That is, the tool 10 is hung from the well casing 16, is packed off against the interior of the well casing to prevent fluid flow upward in the annular space, and the port collar is closed to cause the well production fluid to flow through the slotted liner 15. Thus it may be seen that by this invention there is provided an integrated tool for performing all of these functions in a single trip of the well tubing and such functions are performed by simple longitudinal movement or right hand rotation of the tubing in the proper sequence.

Although the invention has been described in connection with a particular embodiment, it is to be understood that the invention is not limited to the details herein described or shown in the drawings but rather the invention is of the full scope of the appended claims.

We claim:

1. In a well tool for use with an operating tool positioned therein to selectively open and close a fluid port to the outside, comprising, a collar means adapted to be held against rotation in the well bore, said collar means having at least one port therein, a sleeve rotatably and substantially concentrically mounted in said collar means and adapted to be rotated by the operating tool, said sleeve having a lateral port therein longitudinally aligned with said collar port and circumferentially alignable upon rotation of the sleeve, and detent means on said collar and sleeve for releaseably locking said sleeve to said collar in positions of alignment and non-alignment of said ports.

2. The well tool of claim 1 in which said detent means includes an axial projection on said sleeve with a circumferential slot in said sleeve axially spaced from said projection a short distance for permitting resilient axial movement of said projection, and at least two mating notches in said collar means positioned for engagement by said projection in positions of port alignment and non-alignment.

3. In a well tool for use with an operating tool positioned therein to selectively open and close a fluid port to the outside, comprising, a collar means adapted to be held against rotation in the well bore, said collar means having a lateral port therein, a sleeve rotatably and concentrically mounted in said collar means at said collar port, said sleeve having a lateral port therein longitudinally aligned with said collar port, means on said sleeve adapted for engagement by the operating tool to impart rotation to the sleeve for selectively aligning said collar and sleeve ports, sealing means encircling at least one of said ports and sealing between said sleeve and collar, and detent means on said collar and sleeve for releaseably locking said sleeve to said collar in positions of alignment and non-alignment of said ports.

4. In a well tool for use with an operating tool positioned therein to selectively open and close a fluid port to the outside, comprising, a collar adapted to be held against rotation in the well bore, said collar having an internal cylindrical bore, said collar having a lateral port therein at said cylindrical bore, a sleeve rotatably mounted in said collar bore, cooperating abutment means on said sleeve and collar for substantially preventing relative longitudinal movement of said sleeve within said collar, said sleeve having a lateral port therein longitudinally aligned with said collar port, means on said sleeve adapted for engagement by the operating tool to impart rotation to the sleeve for selectively aligning said collar and sleeve ports, sealing means encircling at least one of said ports and sealing between said sleeve and collar, and detent means on said collar and sleeve for releaseably locking said sleeve to said collar in positions of alignment and non-alignment of said ports.

5. The well tool of claim 4 in which said detent means includes an axial projection on said sleeve with a circumferential slot in said sleeve axially spaced from said projection a short distance for permitting resilient axial movement of said projection, and at least two mating notches in said collar means positioned for engagement by said projection in positions of port alignment and non-alignment.

6. The well tool of claim 5 in two diametrically spaced ports are provided in said sleeve and in said collar, said sealing means are provided encircling said sleeve ports and at locations intermediate said sleeve ports for encircling said collar ports in the non-alignment position of said collar and sleeve ports, two said axial projections are provided and diametrically spaced on said sleeve, and four of said notches are provided on said collar at 90° spacing.

7. In a well tool for use with an operating tool positioned therein to pack off a liner in a well casing and introduce fluid in the annulus outside the liner, comprising, a tubular housing adapted to be constrained in the well casing, a sleeve means having an upper end adapted to releaseably connect to the operating tool and a lower end adapted to connect to the liner, said sleeve means mounted in said housing for predetermined downward movement relative to said housing, an operating tool having lug means for engaging and urging said sleeve means downwardly, a deformable cylindrical packing element mounted on the exterior of said housing and sleeve means with a lower end fixedly supported on said housing and an upper end fixedly supported on said sleeve means for longitudinal compression and outward deformation into sealing engagement with the well casing upon said downward relative movement of said sleeve means, said sleeve means having a lateral port therein below said packing element, an internal sleeve rotatably mounted in said sleeve means at the location of said port for selective rotation by the operating tool, a lateral port in said internal sleeve selectively alignable with said port in said sleeve means upon rotation for passing fluid from the operating tool to outside the liner, and detent means on said sleeve means and internal sleeve for releaseably locking same in positions of alignment and non-alignment of said ports.

8. In a well tool for use with an operating tool positioned therein to pack off a liner in a well casing and introduce fluid in the annulus outside the liner, comprising, a sleeve means adapted to connect to the operating tool, a tubular housing adapted to be constrained against rotation in the well casing, said sleeve means mounted in said housing for predetermined downward movement relative to said housing, an operating tool having lug means for engaging and urging said sleeve means downwardly, a deformable cylindrical packing element mounted on the exterior of said housing and sleeve means with a lower end fixedly supported on said housing and an upper end fixedly supported on said sleeve means for longitudinal compression and outward deformation into sealing engagement with the well casing upon said downward relative movement of said sleeve means, said sleeve means having a lateral port therein below said packing element, an internal sleeve rotatably mounted in said sleeve means at the location of said port for selective rotation by the operating tool, a lateral port in said internal sleeve selectively alignable with said port in said sleeve means upon rotation, the operating tool having a cross-over passageway therein with a lateral outlet positioned opposite said ports when said lug means engage said sleeve means, and sealing means on either axial side of said outlet for confining the fluid communication to said sleeve ports.

9. In a well tool for use with an operating tool positioned therein to hang and pack off a liner in a well casing and introduce fluid in the annulus outside the liner, comprising, a tubular housing, slip means mounted on said housing for engagement with the well casing upon actuation by the operating tool to support the housing against downward movement in the casing, a sleeve means having an upper end adapted to releaseably connect to the operating tool and a lower end adapted to connect to the liner, said sleeve means mounted in said housing for predetermined downward movement relative to said housing upon actuation by the operating tool, a deformable cylindrical packing element mounted on the exterior of said housing and sleeve means for longitudinal compression and outward deformation into sealing engagement with the casing upon said downward relative movement of said sleeve means, said sleeve means having a lateral port therein below said packing element, an internal sleeve rotatably mounted in said sleeve means at the location of said port for selective rotation by the operating tool, a lateral port in said internal sleeve selectively alignable with said port in said sleeve means upon rotation for passing fluid from the operating tool to outside the liner, and detent means on said sleeve means and internal sleeve for releaseably locking same in positions of alignment and non-alignment of said ports.

10. In a well tool for use in operating a combined packer and port collar tool to release and actuate the packer and to manipulate and pass fluid through the port collar, comprising, a tubular mandrel having an upper end adapted to connect to a string of operating tubing, a releasing sleeve slidably mounted on said mandrel in splined relation for relative longitudinal but not rotational movement, said releasing sleeve having a left-hand thread connected to and supporting the combined tool for right-hand rotation of the mandrel to release the combined tool, expandable lugs mounted on said mandrel for expanding to an outward position upon upward movement of the mandrel relative to the combined tool, for engaging and actuating the packer upon subsequent downward movement and then supporting the mandrel on the packer, a pair of longitudinally spaced and opposed sealing means mounted on said mandrel for sealably engaging the port collar on either side of the fluid port in the said lug-supported position of the mandrel, means on said mandrel for engaging and operating the port collar between open and closed positions upon rotation of the mandrel, and said mandrel having cross-over passageways therein separately communicating the inside of the upper end with the exterior at a location between said opposed sealing means and communicating the inside of the mandrel below said seal means with the exterior at a location above said opposed sealing means.

11. The well tool of claim 10 in which said expandable lugs are mounted on a housing sleeve, which sleeve is rotatably mounted on said mandrel, and a thrust bearing is provided between said mandrel and housing sleeve for relatively frictionless rotation of said mandrel in the said lug-supported position.

12. The well tool of claim 10 in which said means for engaging and operating the port collar included means for centering the mandrel in the port collar and at least one radially expanding lug extending longitudinally and adapted to engage a keyway in the port collar, and spring means urging said lug outwardly.

13. In a well tool and removable operating tool positioned therein for use in hanging and packing off a liner in a well casing and introducing fluid in the annulus outside the liner, comprising: an operating tool having a tubular mandrel adapted to connect to a string of operating tubing, a releasing sleeve mounted on said mandrel in splined relation and having a left-hand thread, expandable lugs mounted on said mandrel for expanding outwardly upon upward movement of the mandrel, spaced exterior sealing means mounted on said mandrel below said expandable lugs, and said mandrel having cross-over passageways therein communicating the upper end with the exterior spaced sealing means and communicating the lower end of the mandrel with the exterior above said sealing means; a well tool mounted on said operating tool having an elongated tubular housing and a sleeve means, slip means mounted on said housing for engagement with the well casing, said sleeve means having an upper end threadedly connected to the left-hand threads of said releasing sleeve and a lower end adapted to connect to the liner, said sleeve means mounted in said housing for predetermined downward movement relative to said housing upon engagement by said expandable lugs of the operating tool, a deformable cylindrical packing element mounted on the exterior of said housing and sleeve means longitudinally compressible for outward deformation into sealing engagement with the casing upon said downward movement of said sleeve means, said sleeve means having a selectively openable lateral port therein below said packing element located between said spaced sealing means with said operating tool lugs engaging said sleeve means.

14. The combination of claim 13 in which said well tool includes an internal sleeve rotatably mounted in said sleeve means at the location of said lateral port for selective rotation by the operating tool and a lateral port in said internal sleeve is selectively alignable with said port in said sleeve means upon rotation for passing fluid from the operating tool to outside the liner.

15. The combination of claim 14 in which said internal sleeve has an axially extending internal keyway and said operating tool has second expandable lug means for engaging said keyway for transmitting rotational movements to said internal sleeve.

16. In a well tool and removable operating tool positioned therein for use in hanging and packing off a liner in a well casing, comprising: an operating tool having a tubular mandrel adapted to connect to a string of operating tubing, a releasing sleeve mounted on said mandrel in splined relation and having a left-hand thread, expandable lugs mounted on said mandrel for expanding outwardly upon upward movement of the mandrel, a well tool releaseably mounted on said operating tool having an elongated tubular housing and a sleeve means, slip means mounted on said housing for engagement with the well casing upon actuation by the operating tool to support the housing against downward movement in the casing, a sleeve means having an upper end having left-hand threads for threaded connection to the releasing sleeve of the operating tool and having a lower end adapted to connect to the liner, said sleeve means mounted in said housing for predetermined downward movement relative to said housing upon engagement by said expandable lugs of the operating tool, and a deformable cylindrical packing element mounted on the exterior of said housing and sleeve means having a lower end fixedly supported on said housing and an upper end fixedly supported on said sleeve means for longitudinal compression and outward deformation into sealing engagement with the casing upon said downward relative movement of said sleeve means.

17. In a well tool and a removable operating tool positioned therein for use in hanging a liner in a well casing, comprising: an operating tool having a mandrel adapted to connect to an operating string of tubing and a release sleeve mounted on said mandrel in splined relation, said release sleeve having a left-hand threaded connection with said well tool for upward unthreading movement upon right-hand rotation of said mandrel; said well tool having an elongated tubular housing encircling the operating tool, plural slip means mounted on said housing for upward-outward movement into engagement with the well casing upon actuation by the operating tool to support the housing against downward movement in the casing, said slip means having inwardly facing projections, said release sleeve having an external groove receiving said projections for restraining said slip means against said upward-outward movement until said unthreading movement of said release sleeve, and said unthreading upward movement of said release sleeve urging said slip means upward by means of said projections and then completely releasing said slip means.

18. The combination of claim 17 in which said each slip means has a flat back surface of substantially the size of the slip means and is mounted in surface contact with said housing for full structural support.

19. The combination of claim 17 in which said slip means are connected to a circular ring surrounding said housing, and a helical spring encircles said housing below and in engagement with said ring and continually urges said slip means upwardly.

20. In a well tool for hanging a liner and the operating tool therefor, plural slips mounted on the well tool in a manner for longitudinal movement of the slips to accomplish the outward movement into engaging position for hanging the liner and a longitudinally movable threaded bushing on the operating tool for selectively releasing the well tool from the operating tool, the improvement comprising; an abutment on each slip engaged by a shoulder means on said movable bushing upon releasing movement of the bushing to release the well tool, and the said interengagement of said slip abutments and bushing shoulder means causing forceable urging of said slips longitudinally toward liner hanging position.

21. The improvement of claim 20 in which said slip abutment is in inward projection positioned within a groove in said bushing forming said shoulder means for both restraining said slips before release and causing said forceable urging toward hanging position.

22. In a well tool for sealably packing off an annular space between the tool and a surrounding casing in which a tubular packing element on the tool is longitudinally compressible from its ends to deformably expand radially to accomplish such seal, the improvement comprising, a pair of circumferentially expandable rings surroundings each end of the packing element, said rings of each pair positioned in longitudinally side-by-side relation and having mating abutting surfaces of a shape to retain radial alignment therebetween and produce circumferential expansion of one upon circumferential expansion of the other, the ring of each pair that is more remote from the other pair of rings having an inclined surface for mating with a like surface on the tool to move outwardly and longitudinally away from the other pair of rings upon circumferential radial expansion to rigidly support the packing element in the expanded condition, and each said more remote ring being substantially square in cross-section with the sides positioned at 45° with the axis of the packer element and the other ring of each pair is chevron-shaped in cross-section.

23. The improvement of claim 22 in which each said more remote ring has a radial thickness of at least nearly the size of the annular space.

References Cited

UNITED STATES PATENTS

| | | | |
|---|---|---|---|
| 999,731 | 8/1911 | Alten et al. | 251—345 |
| 2,442,544 | 6/1948 | Johnson | 166—124 |
| 2,701,704 | 2/1955 | Lawrence | 251—297 |
| 2,877,850 | 3/1959 | Burns | 166—124 |
| 2,896,724 | 7/1959 | Baker | 277—116.2 |
| 3,061,013 | 10/1962 | Thomas | 277—116.2 |
| 3,171,491 | 3/1965 | States | 166—208 |
| 3,324,951 | 6/1967 | Balmer et al. | 251—297 |

JAMES A. LEPPINK, *Primary Examiner.*

U.S. Cl. X.R.

166—127, 208; 137—553; 251—345; 137—625.31